US012604322B2

(12) United States Patent
Liu et al.

(10) Patent No.: US 12,604,322 B2
(45) Date of Patent: Apr. 14, 2026

(54) CONTROL INFORMATION CONFIGURATION METHOD AND APPARATUS, CONTROL INFORMATION CONTENT DETERMINING METHOD AND APPARATUS, AND RELATED ELECTRONIC DEVICE

(71) Applicant: VIVO MOBILE COMMUNICATION CO., LTD., Dongguan (CN)

(72) Inventors: Siqi Liu, Dongguan (CN); Zichao Ji, Dongguan (CN); Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 467 days.

(21) Appl. No.: 17/981,461

(22) Filed: Nov. 6, 2022

(65) Prior Publication Data

US 2023/0055387 A1 Feb. 23, 2023

Related U.S. Application Data

(63) Continuation of application No. PCT/CN2021/091974, filed on May 7, 2021.

(30) Foreign Application Priority Data

May 7, 2020 (CN) .......................... 202010379347.7

(51) Int. Cl.
*H04W 36/00* (2009.01)
*H04W 72/23* (2023.01)

(52) U.S. Cl.
CPC ....... *H04W 72/23* (2023.01); *H04W 36/0016* (2013.01)

(58) Field of Classification Search
CPC ............ H04W 72/23; H04W 36/0016; H04W 72/232; H04W 8/22; H04W 76/15;
(Continued)

(56) References Cited

U.S. PATENT DOCUMENTS

2019/0297640 A1* 9/2019 Liou ....................... H04L 5/001
2022/0061080 A1* 2/2022 Takeda .................. H04L 5/0044

FOREIGN PATENT DOCUMENTS

CN 110391867 A 10/2019
CN 110475356 A 11/2019
(Continued)

OTHER PUBLICATIONS

Extended European Search Report issued in related European Application No. 21799681.8, mailed Sep. 21, 2023, 10 pages.
(Continued)

*Primary Examiner* — Lakeram Jangbahadur
(74) *Attorney, Agent, or Firm* — IPX PLLC

(57) ABSTRACT

A control information configuration method and apparatus, a control information content determining method and apparatus, and an electronic device, are provided. The control information configuration method is performed by a first serving cell, the first serving cell is scheduled by a second serving cell, and the method includes: sending first control information to a terminal, where the first control information is determined according to at least one of the following: second control information sent on the second serving cell to the terminal; a configuration from a base station on the terminal; a characteristic of the terminal; and a capability supported by the terminal.

14 Claims, 5 Drawing Sheets

Send second control information to a terminal, where the second control information is determined according to at least one of the following:
a configuration from a base station on the terminal;
a characteristic of the terminal; and
a capability supported by the terminal

/ 201

(58) Field of Classification Search
CPC ............. H04W 72/0453; H04L 5/0098; H04L
5/0092; H04L 5/001; H04L 5/0053
See application file for complete search history.

(56) References Cited

FOREIGN PATENT DOCUMENTS

| WO | 2015037250 A1 | 3/2015 |
| WO | 2020053941 A1 | 3/2020 |

OTHER PUBLICATIONS

International Search Report issued in corresponding International Application No. PCT/CN2021/091974, mailed Jul. 27, 2021, 4 pages.
Ericsson, "DCI format design for TDD-FDD CA", 3GPP TSG RAN WG1 Meeting #76 R1-140751, Feb. 14, 2014.

* cited by examiner

Send first control information to a terminal, where the first control information is determined according to at least one of the following: second control information sent on a second serving cell to the terminal;
a configuration from a base station on the terminal;
a characteristic of the terminal; and
a capability supported by the terminal

101

Send second control information to a terminal, where the second control information is determined according to at least one of the following:
a configuration from a base station on the terminal;
a characteristic of the terminal; and
a capability supported by the terminal

Obtain first control information of a first serving cell and/or second control information of a second serving cell, where the first serving cell is scheduled by the second serving cell

301

Perform transmission according to the first control information and/or the second control information

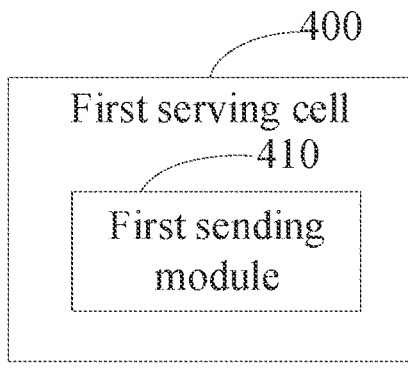

400

First serving cell

410

First sending module

Obtaining module

Processing module

CONTROL INFORMATION CONFIGURATION METHOD AND APPARATUS, CONTROL INFORMATION CONTENT DETERMINING METHOD AND APPARATUS, AND RELATED ELECTRONIC DEVICE

CROSS-REFERENCE TO RELATED APPLICATIONS

This application is a continuation of International Application No. PCT/CN2021/091974, filed on May 7, 2021, which claims priority to Chinese Patent Application No. 202010379347.7, filed on May 7, 2020. The entire contents of each of the above-identified applications are expressly incorporated herein by reference.

TECHNICAL FIELD

This application relates to the field of communications technologies, and in particular, to a control information configuration method and apparatus, a control information content determining method and apparatus, and an electronic device.

BACKGROUND

In New Radio (NR), only one carrier (or cell) can be scheduled by a specified carrier (or cell). One carrier (or cell) can be scheduled by different carriers (or cells), so that overheads of a physical downlink control channel can be effectively reduced. However, if one cell or carrier is scheduled by different cells or carriers, because control configurations of different scheduling cells or carriers may be different, content and/or bit quantities included in corresponding control configuration information and/or downlink control information may be different, thereby increasing complexity of blind detection by a terminal.

SUMMARY

Embodiments of this application provide a control information configuration method and apparatus, a control information content determining method and apparatus, and an electronic device, to reduce complexity of blind detection by a terminal.

According to a first aspect, an embodiment of this application provides a control information configuration method, applied to a first serving cell, where the first serving cell is scheduled by a second serving cell, and the method includes:

sending first control information to a terminal, where the first control information is determined according to at least one of the following:

second control information sent on the second serving cell to the terminal;

a configuration from a base station on the terminal;

a characteristic of the terminal; and a capability supported by the terminal, where the first control information is used to schedule, on the first serving cell, transmission or resources of the first serving cell and the second control information is used to schedule, on the second serving cell, transmission or resources of the first serving cell.

According to a second aspect, an embodiment of this application provides a control information configuration method, applied to a second serving cell, where the second serving cell schedules a first serving cell, and the method includes:

sending second control information to a terminal, where the second control information is determined according to at least one of the following:

a configuration from a base station on the terminal;

a characteristic of the terminal; and a capability supported by the terminal, where the second control information is used to schedule, on the second serving cell, transmission or resources of the first serving cell.

According to a third aspect, an embodiment of this application provides a control information content determining method, applied to a terminal of a first serving cell, where the method includes:

obtaining first control information of the first serving cell and/or second control information of a second serving cell, where the first serving cell is scheduled by the second serving cell; and performing transmission according to the first control information and/or the second control information, where content of the first control information is determined according to at least one of the following:

the second control information;

a configuration from a base station on the first serving cell;

a characteristic of the terminal; and a capability supported by the terminal; and content of the second control information is determined according to at least one of the following:

a configuration from a base station on the second serving cell;

a characteristic of the terminal; and a capability supported by the terminal.

According to a fourth aspect, an embodiment of this application further provides a control information configuration apparatus, applied to a first serving cell, where the first serving cell is scheduled by a second serving cell, and the apparatus includes:

a first sending module, configured to send first control information to a terminal, where the first control information is determined according to at least one of the following:

second control information sent on the second serving cell to the terminal;

a configuration from a base station on the terminal;

a characteristic of the terminal; and, a capability supported by the terminal, where the first control information is used to schedule, on the first serving cell, transmission or resources of the first serving cell, and the second control information is used to schedule, on the second serving cell, transmission or resources of the first serving cell.

According to a fifth aspect, an embodiment of this application further provides a control information configuration apparatus, applied to a second serving cell, where the second serving cell schedules a first serving cell, and the apparatus includes:

a second sending module, configured to send second control information to a terminal, where the second control information is determined according to at least one of the following:

a configuration from a base station on the terminal;

a characteristic of the terminal; and a capability supported by the terminal, where the second control information is used to schedule, on the second serving cell, transmission or resources of the first serving cell.

According to a sixth aspect, an embodiment of this application further provides a control information content determining apparatus, applied to a terminal of a first serving cell, where the apparatus includes:

an obtaining module, configured to obtain first control information of the first serving cell and/or second control information of a second serving cell, where the first serving cell is scheduled by the second serving cell; and a processing module, configured to perform transmission according to the first control information and/or the second control information, where content of the first control information is determined according to at least one of the following:

the second control information;

a configuration from a base station on the first serving cell;

a characteristic of the terminal; and a capability supported by the terminal; and content of the second control information is determined according to at least one of the following:

a configuration from a base station on the second serving cell;

a characteristic of the terminal; and a capability supported by the terminal.

According to a seventh aspect, an embodiment of this application further provides an electronic device, including a processor, a memory, and a program or an instruction that is stored in the memory and that can be run on the processor, where when the program or the instruction is executed by the processor, the steps of the foregoing method are implemented.

According to an eighth aspect, an embodiment of this application provides a readable storage medium. The readable storage medium stores a program or an instruction, and when the program or the instruction is executed by a processor, the steps of the foregoing method are implemented.

According to a ninth aspect, an embodiment of this application provides a chip. The chip includes a processor and a communications interface, the communications interface is coupled to the processor, and the processor is configured to run a program or an instruction to implement the methods in the first aspect, the second aspect, and the third aspect.

In the embodiments of this application, first control information may be determined according to second control information sent on a second serving cell to a terminal, a configuration from a base station on the terminal, a characteristic of the terminal, and/or a capability supported by the terminal; and the second control information is determined according to the configuration from the base station on the terminal, the characteristic of the terminal, and/or the capability supported by the terminal.

BRIEF DESCRIPTION OF DRAWINGS

The following describes the accompanying drawings required for describing the embodiments of this application. Apparently, the accompanying drawings in the following description show merely some embodiments of this application, and a person of ordinary skill in the art may derive other drawings from these accompanying drawings without creative efforts.

FIG. 1 is a schematic diagram of a wireless communications system;

FIG. 2 and FIG. 3 are schematic flowcharts of a control information configuration method according to an embodiment of this application;

FIG. 4 is a schematic flowchart of a control information content determining method according to an embodiment of this application;

FIG. 5 and FIG. 6 are structural block diagrams of a control information configuration apparatus according to an embodiment of this application;

FIG. 7 is a structural block diagram of a control information content determining apparatus according to an embodiment of this application;

DETAILED DESCRIPTION

Figures 1, 2:
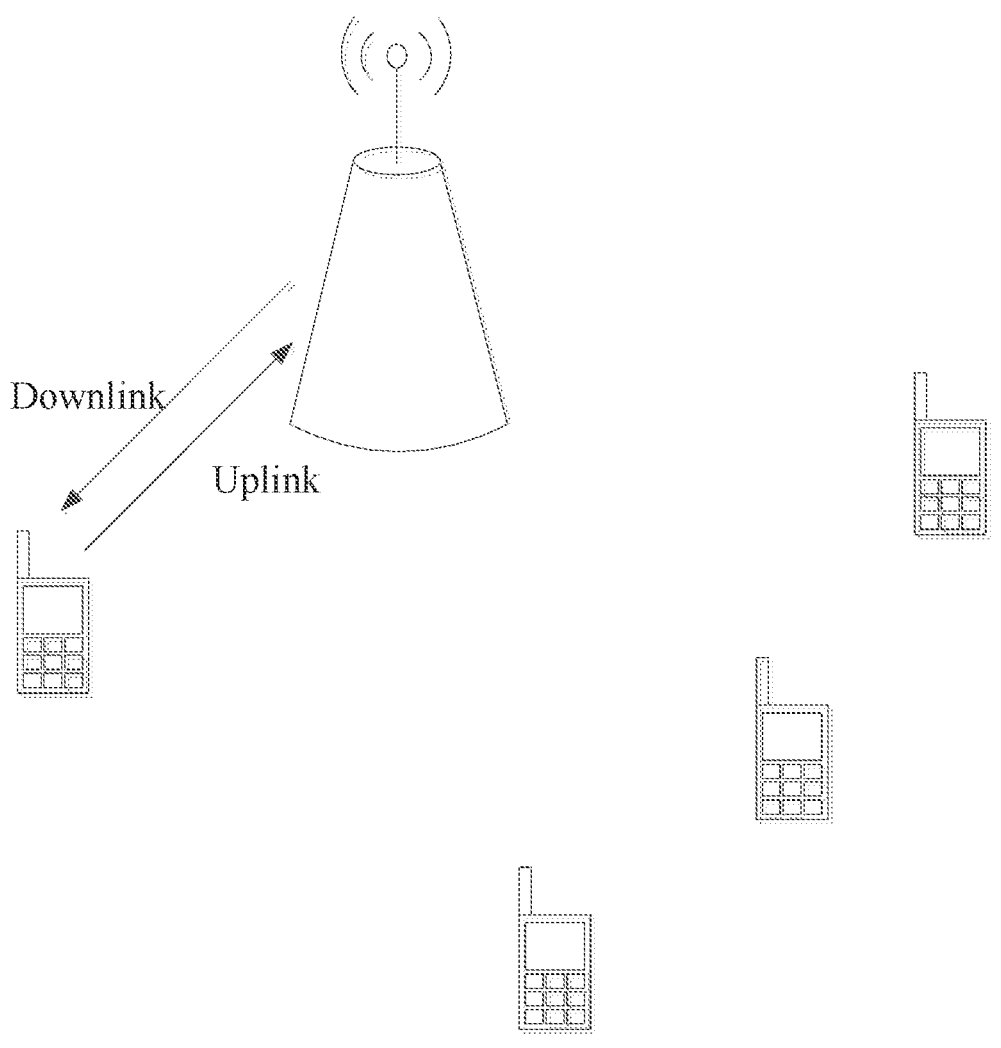

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first," "second," and the like are intended to distinguish between similar objects but do not describe a specific order or sequence. It should be understood that the data used in such a way is interchangeable in proper circumstances so that the embodiments of this application can be implemented in an order other than the order illustrated or described herein. In addition, in the specification and the claims, "and/or" represents at least one of connected objects, and a character "/" generally represents an "or" relationship between associated objects.

The technology described in this specification is not limited to a Long Term Evolution (LTE)/LTE-Advanced (LTE-A) system, and can also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" are often used interchangeably. The CDMA system may implement wireless technologies such as CDMA2000 and Universal Terrestrial Radio Access (UTRA). UTRA includes Wideband CDMA (WCDMA) and other CDMA variants. The TDMA system can implement radio technologies such as Global System for Mobile Communication (GSM). The OFDMA system can implement radio technologies such as Ultra-Mobile Broadband (UMB), Evolved-UTRA (Evolution-UTRA, E-UTRA), IEEE 802.11 (Wi-Fi), IEEE 802.16 (WiMAX), IEEE 802.20, and Flash-OFDM. UTRA and E-UTRA are parts of a Universal Mobile Telecommunications System (UMTS). LTE and more advanced LTE (for example, LTE-A) are new UNITS versions using E-UTRA. UTRA, E-UTRA, UMTS, LTE, LTE-A, and GSM are described in the literature from an organization called 3rd Generation Partnership Project (3GPP). CDMA2000 and UMB are described in the literature from an organization called "3rd Generation Partnership Project 2" (3GPP2). The technologies described herein can be used both in the systems and radio technologies mentioned above, and can also be used in other systems and radio technologies. However, the following descriptions describe an NR system for example purposes, and NR terms are used in most of the following descriptions, although these techniques can also be applied to an application other than an NR system application.

The following description provides examples without limiting the scope, applicability, or configuration set forth in the claims. The functions and arrangements of the elements under discussion may be changed without departing from the spirit and scope of the present disclosure. In the examples, various procedures or components may be appropriately omitted, replaced, or added. For example, the described method may be performed in an order different from that described, and steps may be added, omitted, or combined. In addition, features described with reference to some examples may be combined in other examples.

Referring to FIG. 1, FIG. 1 is a block diagram of a wireless communications system to which embodiments of this application can be applied. The wireless communications system includes a terminal 11 and a network side device 12. The terminal 11 may also be referred to as a terminal device to User Equipment (UE). The terminal 11 may be a terminal side device such as a mobile phone, a tablet personal computer, a laptop computer, a Personal Digital Assistant (PDA), a Mobile Internet Device (MID), a wearable device, or an in-vehicle device. It should be noted that a specific type of the terminal 11 is not limited in the embodiments of this application. The network side device 12 may be a base station or a core network. The base station may be a base station of 5G or a later version (for example, gNB or 5G NR NB), or a base station in another communications system (for example, an eNB, a WLAN access point, or another access point), or a location server (for example, an E-SMLC or a Location Manager Function (IMF)), The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specified technical term. It should be noted that, in the embodiments of this application, only a base station in an NR system is used as an example, but a specific type of the base station and a specific communications system are not limited in the embodiments of this application.

In New Radio (NR), both a Primary Cell (Pcell) and a Secondary cell (Scell) may be configured as self-scheduling, and cross-carrier scheduling may be performed on only the Scell by using the Pcell or another Scell. When a serving cell is configured as self-scheduling, whether Downlink Control Information (DCI) formats 0_1 and 1_1 have a Carrier indicator Field (CIF) may be configured; and when the Scell is configured as cross-carrier scheduling, an ID of a serving cell for scheduling the cell and a CIF value during scheduling during the serving cell need to be configured.

In cross-carrier scheduling, a CIF state (cif-Presence) is used to indicate whether a 3-bit CIF exists in DCI of a scheduling cell, where true indicates that the 3-bit CIF exists; otherwise, it indicates that the 3-bit CIF does not exist.

A Control Resource SET (CORESET) configuration of the scheduling cell indicates, by using a value of tci-PresentInDCI, that a Transmission Configuration Indication (TCI) field exists in the DCI of the scheduling cell. If tci-PresentInDCI=enable, it indicates that a 3-bit TCI field exists in the DCI; otherwise, 0 bit.

A TCI and a CIF necessarily exist in DCI for cross-carrier scheduling, or in other words, the two fields necessarily exist in some pieces of DCI of a cell when the cell supports cross-carrier scheduling. In the existing MR technology, one piece of DCI can schedule only one cell or carrier at a time. However, if one cell or carrier is scheduled by different cells or carriers, because cross-carrier configurations of different scheduling cells or carriers may be different, content and bit quantities included in corresponding DCI may be different.

For example, a Component Carrier (CC) 1 may be scheduled by the CC1 and a CC2. Because scheduling the CC1 by the CC2 belongs to cross-carrier scheduling, at least one of a. TCI and a CIF exists in Del for scheduling the CC1 by the CC2. When the CC1 is scheduled by the CC1 itself, these fields may not exist in self-scheduling DCI, thereby resulting in different DCI sizes and increasing complexity of blind detection by a terminal.

An embodiment of this application provides a control information configuration method, applied to a first serving cell, where the first serving cell is scheduled by a second serving cell. As shown in FIG. 2, the method includes the following steps.

Step 101: Send first control information to a terminal, where the first control information is determined according to at least one of the following:
  second control information sent on the second serving cell to the terminal;
  a configuration from a base station on the terminal;
  a characteristic of the terminal; and
  a capability supported by the terminal.

In some embodiments of this application, the first control information is used to schedule, on the first serving cell, transmission or resources of the first serving cell, and the second control information is used to schedule, on the second serving cell, transmission or resources of the first serving cell. The transmission includes at least one of sending and receiving.

The serving cell may include a CC.

In this embodiment of this application, the first control information may be determined according to the second control information sent on the second serving cell to the terminal, the configuration from the base station on the terminal, the characteristic of the terminal, and/or the capability supported by the terminal, thereby reducing complexity of blind detection by the terminal.

In this embodiment of this application, for example, the first serving cell may be scheduled by the first serving cell itself, or may be scheduled by another second serving cell.

In some implementations, the configuration from the base station on the terminal is: the base station configures that the terminal supports cross-carrier scheduling, or the characteristic of the terminal is: the terminal supports cross-carrier scheduling, or the capability supported by the terminal is: the terminal supports cross-carrier scheduling.

In some implementations, the configuration from the base station on the terminal is: one cell may be scheduled by a plurality of cells, or the characteristic of the terminal is: the terminal supports that one cell may be scheduled by a plurality of cells, or the capability supported by the terminal is: the terminal supports that one cell may be scheduled by a plurality of cells.

In some implementations, the configuration from the base station on the terminal is: a primary cell may be scheduled by a secondary cell, or the characteristic of the terminal is: the terminal supports that a primary cell may be scheduled by a secondary cell, or the capability supported by the terminal is: the terminal supports that a primary cell may be scheduled by a secondary cell.

In some implementations, the configuration from the base station on the terminal is: a primary cell may be scheduled by the primary cell and a secondary cell, or the characteristic of the terminal is: the terminal supports that a primary cell may be scheduled by the primary cell and a secondary cell, or the capability supported by the terminal is: the terminal supports that a primary cell may be scheduled by the primary cell and a secondary cell.

For example, if the configuration from the base station on the terminal is: the primary cell may be scheduled by the primary cell and the secondary cell, content of the first control information may be determined according to the configuration from the base station on the terminal. In a possible example, it may be determined, according to the configuration from the base station on the terminal, that the first control information includes a TCI field and/or a CIF. In a possible example, it may be determined, according to configuration from the base station, that the first control information includes TCI information and/or CIF indication information.

For example, if the characteristic of the terminal is: the terminal supports that the primary cell may be scheduled by the primary cell and the secondary cell, content of the first control information may be determined according to the characteristic of the terminal. In an example, it may be determined, according to the characteristic of the terminal, that the first control information includes a TCI field and/or a CIF. In an example, it may be determined, according to the characteristic of the terminal, that the first control information includes TCI information and/or CIF indication information.

For example, if the capability supported by the terminal is: the terminal supports that one cell may be scheduled by a plurality of cells, content of the first control information may be determined according to the capability supported by the terminal. In an example, it may be determined, according to the capability supported by the terminal, that the first control information includes a TCI field and/or a CIF, In an example, it may be determined, according to the capability supported by the terminal, that the first control information includes TCI information and/or CIF indication information.

The first control information includes at least one of the following: first control configuration information and first downlink control information DCI;

and/or the second control information includes at least one of the following: second control configuration information and second downlink control information DCI.

The first control configuration information is implemented as CORESET configuration information, other configuration information such as a cross-carrier configuration, or at least one of a Scell scheduling Pcell configuration, a Pcell control configuration, a scheduled cell configuration, and a self-scheduling configuration. The second control configuration information is implemented as CORESET configuration information, other configuration information such as a cross-carrier configuration, or at least one of a Scell scheduling Pcell configuration, a Scell control configuration, a scheduling cell configuration, and a non-self-scheduling configuration.

In some embodiments of this application, the first control information is first DCI, the second control information is second DCI, and the first control information and the second control information meet at least one of the following rules:

a first rule, where the first rule is that the first DCI does not include a transmission configuration indication TCI field and the second DCI does not include a TCI field, or the first DCI includes a TCI field and the second DCI includes a TCI field; and a second rule, where the second rule is that the first DCI does not include a carrier indicator field CIF and the second DCI does not include a CIF, or the first DCI includes a CIF and the second DCI includes a CIF.

That is, if the second DCI does not include a TCI field, the first DCI does not include a TCI field either, or if the second DCI includes a TCI field, the first DCI also includes a TCI field, so that content of the first DCI can be determined according to content of the second DCI. That is, if the second DCI does not include a CIF, the first DCI does not include a CIF either, or if the second DCI includes a CIF, the first DCI also includes a CIF, so that content of the first DCI can be determined according to content of the second DCI.

In some embodiments of this application, if the first DCI includes a TCI field and the second DCI includes a ICI field, the TCI field included in the first DCI is the same as the TCI field included in the second DCI, where that the TCI field included in the first DCI is the same as the TCI field included in the second DCI may be: the number of bits of the TCI field included in the first DCI is the same as the number of bits of the TCI field included in the second DCI, or a value of the TCI field included in the first DCI is the same as a value of the TCI field included in the second DCII, or a meaning indicated by the TO field included in the first DCI is the same as a meaning indicated by the TCI field included in the second DCI;

and/or if the first DCI includes a CIF and the second DCI includes a CIF, the CIF included in the first DCI is the same as the CIF included in the second DCI, where that the CIF included in the first DCI is the same as the CIF included in the second DCI may be: the number of bits of the CIF included in the first DCI is the same as the number of bits of the CIF included in the second. DCI, or a value of the CIF included in the first DCI is the same as a value of the CIF included in the second DCI, or a meaning indicated by the CIF included in the first DCI is the same as a meaning indicated by the CIF included in the second DCI.

In some embodiments of this application, the first control information is first control configuration information, the second control information is second control configuration information, and the first control information and the second control information meet at least one of the following rules:

a third rule, where the third rule is that the first control configuration information does not include transmission configuration indication TCI information and the second control configuration information does not include TCI information, or the first control configuration information includes TCI information and the second control configuration information includes TCI information; and a fourth rule, where the fourth rule is that the first control configuration information does not include carrier indicator field CIF indication information and the second control configuration information does not include CIF indication information, or the first control configuration information includes CIF indication information and the second control configuration information includes CIF indication information.

That is, if the second control configuration information does not include TCI information, the first control configuration information does not include TCI information either, or if the second control configuration information includes TCI information, the first control configuration information also includes TCI information, so that content of the first control configuration information can be determined according to content of the second control configuration information. That is, if the second control configuration information does not include CIF indication information, the first control configuration information does not include CIF indication information either, or if the second control configuration information includes CIF indication information, the first control configuration information also includes CIF indication information, so that content of the first control configuration information can be determined according to content of the second control configuration information.

In some embodiments of this application, if the first control configuration information includes TO information and the second control configuration information includes TCI information, the TCI information included in the first control configuration information is the same as the TCI information included in the second control configuration information, where that the TCI information included in the first DCI is the same as the TCI information included in the second DCI may be: the number of bits of the TCI information included in the first DCI is the same as the number of bits of the TCI information included in the second DCI, or a value of the TCI information included in the first DCI is the same as a value of the ICI information included in the second DCI, or a meaning indicated by the TCI information included in the first DCI is the same as a meaning indicated by the TCI information included in the second DCI; and/or if the first control configuration information includes CIF indication information and the second control configuration information includes CIF indication information, the CIF indication information included in the first control configuration information is the same as the CIF indication information included in the second control configuration information, where that the CIF indication information included in the first DCI is the same as the CIF indication information included in the second DCI may be: the number of bits of the CIF indication information included in the first DCI is the same as the number of bits of the CIF indication information included in the second DCI, or a value of the CIF indication information included in the first DCI is the same as a value of the CIF indication information included in the second DCI, or a meaning indicated by the CIF indication information included in the first DCI is the same as a meaning indicated by the CIF indication information included in the second DCI.

In some embodiments of this application, the TCI information meets at least one of the following:

a value of the TCI information is a first value, and the first value is 1, true, or enable; and the TCI information is the first number of bits, and the first number of bits may be 1, 2, or 3.

The TCI information may be expressed by using different parameters.

In some embodiments of this application, the TCI information indicates at least one of the following:

the first DCI sent on the first serving cell to the terminal includes a TCI; and the first DCI includes a TO of the first number of bits.

In some embodiments of this application, the first control information is first DCI, the first DCI includes a TCI of the fourteenth number of bits, and the fourteenth number of bits may be 1, 2, or 3.

In some embodiments of this application, the TCI information is tci-PresentInDCI, and the first serving cell is a CC1, tci-PresentInDCI of control configuration information that may be used to schedule at least the CC1 on the CC1 is set to 1 or true or enable, or tci-PresentInDCI indicates that DCI includes a TCI. In some implementations, control configuration information that may be used to schedule at least the CC1 on the CC1 includes tci-PresentInDCI of x0 bits, or tci-PresentInDCI indicates that DCI includes a TCI of x0 bits. For example, tci-PresentInDCI-ForDCI-Format1-2 in the control configuration information that may be used to schedule at least the CC1 on the CC1 includes x0 bits, where x0=1, 2, or 3. In some implementations, x0=x0', and x0' is the number of bits of a TCI included in DCI of the second serving cell or a second component carrier (OSCC, that is, another CC for scheduling the CC1) or the number of bits of tci-PresentInDCI included in control configuration information that may be used to schedule at least the CC1 on the OSCC. In some implementations, DCI that may be used to schedule at least the CC1 on the CC1 includes a TCI of x1 bits. In some implementations, x1=3, x1=x0, or x1=x0'.

The scheduling at least the CC1 includes at least one of two cases in which only the CC1 can be scheduled and the CC1 and a CC other than the CC1 can be scheduled.

The control configuration information may be CORESET configuration information.

In some embodiments of this application, the CIF indication information meets at least one of the following:

a value of the CIF indication information is a second value, the second value is 1 or true, and the CIF indication information may be cif-Presence; and the CIF indication information is the second number of bits, the CIF indication information may be a carrierIndicatorSize, and the second number of bits may be 0, 1, 2, or The CIF indication information may be expressed by using different parameters, for example, carrierindicatorSize and cif-Presence.

In some embodiments of this application, the CIF indication information indicates at least one of the following:

the first DCI sent on the first serving cell to the terminal includes a CIF; and the first DCI includes a CIF of the second number of bits.

In some embodiments of this application, the first control information is first DCI, the first DCI includes a CIF of the fifteenth number of bits, and the fifteenth number of bits may be 0, 1, 2, or 3.

In some embodiments of this application, the CIF indication information is cif-Presence, and cif-Presence of the CC1 is set to 1 or true, or cif-Presence indicates that DCI includes a CIF. In some embodiments, the CIF indication information is carrierIndicatorSize, and carrierIndicatorSize of the CC1 includes y0 bits. For example, carrierIndicatorSizeForDCI-Format1-2 of the CC1 includes y0 bits. In some implementations, y0=0, 1, 2, or For another example, carrierIndicatorSizeForDCI-Format0-2 of the CC1 includes y0 bits. In the foregoing two examples, in some implementations, y0=0, 1, 2, or 3, or in some implementations, y0=y0', and y0' is the number of bits of a CIF included in DCI of the second serving cell or a second component carrier (OSCC), or the number of bits of carrierIndicatorSize included in control configuration information that may be used to schedule at least the CC1 on the OSCC. In the foregoing two examples, y0 may be different. In some implementations, DCI that may be used to schedule at least the CC1 on the CC1 includes a CIF of y1 bits. In some implementations, y1=3, y1=y0, or y1=y0'.

In some embodiments of this application, the control configuration information including the CIF indication information may be cross-carrier scheduling configuration information.

In the foregoing embodiment, the first serving cell supports, configures, or enables cross-carrier scheduling; and/or the second serving cell supports, configures, or enables cross-carrier scheduling.

In some implementations, the DCI for scheduling the CC1 may be non-fallback DCI.

In some implementations, the DCI for self-scheduling of the CC1 is at least one of DCI format a-1, DCI format a-2, and DCI format a-b, which may be a same DCI format or different DCI formats, where a is a natural number, and b is a natural number. For example, the DCI is at least one of DCI format 1-1, DCI format 1-2, DCI format 0-2, DCI format 0-3, and DCI format 1-3.

After the foregoing steps, the DCI for self-scheduling of the CC1 or the DCI for scheduling the CC1 on the OSCC includes a same field, and the field occupies a same quantity of bits, Therefore, sizes of the two pieces of DCI are the same, thereby reducing complexity of blind detection by the terminal.

An embodiment of this application provides a control information configuration method. The method is applied to a second serving cell, and the second serving cell schedules a first serving cell. As shown in FIG. 3, the method includes the following steps.

Step 201: Send second control information to a terminal, where the second control information is determined according to at least one of the following:

a configuration from a base station on the terminal;

a characteristic of the terminal; and a capability supported by the terminal.

In this embodiment of this application, the second control information is used to schedule, on the second serving cell, transmission or resources of the first serving cell. The transmission includes at least one of sending and receiving.

The serving cell may be a CC.

In this embodiment of this application, the second control information may be determined according to the configuration from the base station on the terminal, the characteristic of the terminal, and/or the capability supported by the terminal, thereby reducing complexity of blind detection by the terminal.

In some implementations, the configuration from the base station on the terminal is: the base station configures that the terminal supports cross-carder scheduling, or the characteristic of the terminal is: the terminal supports cross-carrier scheduling, or the capability supported by the terminal is: the terminal supports cross-carrier scheduling.

In some implementations, the configuration from the base station on the terminal is: one cell may be scheduled by a plurality of cells, or the characteristic of the terminal is: the terminal supports that one cell may be scheduled by a plurality of cells, or the capability supported by the terminal is: the terminal supports that one cell may be scheduled by a plurality of cells.

In some implementations, the configuration from the base station on the terminal is: a primary cell may be scheduled by a secondary cell, or the characteristic of the terminal is: the terminal supports that a primary cell may be scheduled by a secondary cell, or the capability supported by the terminal is: the terminal supports that a primary cell may be scheduled by a secondary cell.

In some implementations, the configuration from the base station on the terminal is: a primary cell may be scheduled by the primary cell and a secondary cell, or the characteristic of the terminal is: the terminal supports that a primary cell may be scheduled by the primary cell and a secondary cell, or the capability supported by the terminal is: the terminal supports that a primary cell may be scheduled by the primary cell and a secondary cell.

For example, if the configuration from the base station on the terminal is: the primary cell may be scheduled by the primary cell and the secondary cell, content of the second control information may be determined according to the configuration from the base station on the terminal. In an example, it may be determined, according to the configuration from the base station on the terminal, that the second control information includes a TCI field and/or a CIF. In an example, it may be determined, according to the configuration from the base station, that the second control information includes TCI information and/or CIF indication information.

For example, if the characteristic of the terminal is: the terminal supports that the primary cell may be scheduled by the primary cell and the secondary cell, content of the second control information may be determined according to the characteristic of the terminal. In an example, it may be determined, according to the characteristic of the terminal, that the second control information includes a XI field and/or a CIF. In an example, it may be determined, according to the characteristic of the terminal, that the second control information includes TCI information and/or CIF indication information.

For example, if the capability supported by the terminal is: the terminal supports that one cell may be scheduled by a plurality of cells, content of the second control information may be determined according to the capability supported by the terminal. In an example, it may be determined, according to the capability supported by the terminal, that the second control information includes a TCI field and/or a CIF. In an example, it may be determined, according to the capability supported by the terminal, that the second control information includes TCI information and/or CIF indication information.

The second control information includes at least one of the following: control configuration information, and downlink control information DCI. The control configuration information may be implemented as CORESET configuration information, or other configuration information such as a cross-carrier configuration, or at least one of a Scell scheduling Pcell configuration, a Pcell control configuration, a scheduled cell configuration, and a self-scheduling configuration.

In some embodiments of this application, the second control information is control configuration information, the control configuration information includes transmission configuration indication TCI information, and the TCI information meets at least one of the following:

a value of the TCI information is a third value, and the third value is 1, true, or enable; and the TCI information is the third number of bits, and the third number of bits may be 1, 2, or 3.

The TCI information may be expressed by using different parameters.

In some embodiments of this application, the second control information is control configuration information, the control configuration information includes TCI information, and the TCI information indicates at least one of the following: the DCI sent on the second serving cell to the terminal includes a TCI; and the DCI includes a TCI of the third number of bits.

In some embodiments of this application, the second control information is DCI, the DCI includes a TCI of the fourth number of bits, and the fourth number of bits may be 1, 2, or 3.

In some embodiments of this application, the TCI information is tci-PresentinDCI, the second serving cell or a component carrier is an OSCC, that is, another CC for scheduling a CC1, and the first serving cell or a component carrier is the CC1. tci-PresentInDCI of control configuration information that may be used to schedule at least the CC1 on the OSCC is set to 1 or true or enable, or tci-PresentInDCI indicates that the DCI includes a TCI. In some implementations, control configuration information that may be used to schedule at least the CC1 on the OSCC includes tci-PresentInDCI of x0' bits, or tci-PresentInDCI indicates that the DCI includes a TCI of x0' bits. For example, tci-PresentInDCI-ForDCI-Format1-2 in the control configuration information that may be used to schedule at least the CC1 on the OSCC includes x0' bits. In some implementations, x0'=1, 2, or 3. In some implementations, DCI that may be used to schedule at least the CC1 on the OSCC includes a transmission configuration indication of x2 bits. In some implementations, x2=3, or x2=x0'.

The scheduling at least the CC1 includes at least one of two cases in which only the CC1 can be scheduled and the CC1 and a CC other than the CC1 can be scheduled.

The control configuration information may be CORESET configuration information.

In some embodiments of this application, the second control information includes carrier indicator field CIF indication information, and the CIF indication information meets at least one of the following:

a value of the CIF indication information is a fourth value, the fourth value is 1 or true, and the CIF indication information may be cif-Presence; and the CIF indication information is the fifth number of bits, the CIF indication information may be carrierindicatorSize, and the fifth number of bits may be 0, 1, 2, or 3.

The CIF indication information may be expressed by using different parameters, for example, carrierindicatorSize and cif-Presence.

In some embodiments of this application, the second control information is control configuration information, the control configuration information includes CIF indication information, and the CIF indication information indicates at least one of the following:

the DCI sent on the second serving cell to the terminal includes a CIF; and the DCI includes a CIF of the fifth number of bits.

In some embodiments of this application, the second control information is Del, the DCI includes a CIF of the sixth number of bits, and the sixth number of bits may be 0, 1, 2, or 3.

In some embodiments of this application, the CIF indication information is cif-Presence, the second serving cell or a component carrier is an OSCC, the first serving cell or a component carrier is a CC1, and cif-Presence of the OSCC is set to 1 or true, or cif-Presence indicates that DCI includes a CIF. In some embodiments, the CIF indication information is carrierIndicatorSize, and carrierIndicatorSize of the OSCC includes y0' bits. For example, a parameter carrierIndicatorSizeForDCI-Format1-2 of the OSCC includes y0' bits. In some implementations, y0'=0, 1, 2, or 3. For another example, carrierIndicatorSizeForDCI-Format0-2 of the OSCC includes y0' bits. In some implementations, y0'=0, 1, 2, or 3. In some implementations, DCI that may be used to schedule at least the CC1 on the OSCC includes a CIF of y2 bits. In some implementations, y2=3, or y=y2=y0'.

In some embodiments of this application, the control configuration information including the CIF indication information may be cross-carrier scheduling configuration information.

In the foregoing embodiment, the second serving cell supports, configures, or enables cross-carrier scheduling.

In some implementations, the DCI for scheduling the CC1 on the OSCC may be non-fallback DCI.

in some implementations, the DCI for scheduling the CC1 on the OSCC is at least one of DCI format a-1, DCI format a-2, and DCI format a-b, which may be a same DCI format or different DCI formats, where a is a natural number, and b is a natural number. For example, the DCI is at least one of DCI format 1-1, DCI format 1-2, DCI format 0-2, DCI format 0-3, and DCI format 1-3.

After the foregoing steps, the DCI for self-scheduling of the CC1 or the DCI for scheduling the CC1 on the OSCC includes a same field, and/or the field occupies a same quantity of bits. Therefore, sizes of the two pieces of DCI are the same, thereby reducing complexity of blind detection by the terminal.

An embodiment of this application provides a control information content determining method, applied to a terminal of a first serving cell. As shown in FIG. 4, the method includes the following steps.

Step 301: Obtain first control information of the first serving cell and/or second control information of a second serving cell, where the first serving cell is scheduled by the second serving cell.

Step 302: Perform transmission according to the first control information and/or the second control information.

In some embodiments of this application, content of the first control information is determined according to at least one of the following:

the second control information;

a configuration from a base station on the terminal in the first serving cell;

a characteristic of the terminal; and a capability supported by the terminal.

In some embodiments of this application, content of the second control information is determined according to at least one of the following:

a configuration from a base station on the terminal in the second serving cell;

a characteristic of the terminal; and a capability supported by the terminal.

In this embodiment of this application, for example, the first serving cell may be scheduled by the first serving cell itself, or may be scheduled by another second serving cell.

In some implementations, the configuration from the base station on the terminal is: the base station configures that the terminal supports cross-carrier scheduling, or the characteristic of the terminal is: the terminal supports cross-carrier scheduling, or the capability supported by the terminal is: the terminal supports cross-carrier scheduling.

In some implementations, the configuration from the base station on the terminal is: one cell may be scheduled by a plurality of cells, or the characteristic of the terminal is: the terminal supports that one cell may be scheduled by a plurality of cells, or the capability supported by the terminal is: the terminal supports that one cell may be scheduled by a plurality of cells.

In some implementations, the configuration from the base station on the terminal is: a primary cell may be scheduled by a secondary cell, or the characteristic of the terminal is: the terminal supports that a primary cell may be scheduled by a secondary cell, or the capability supported by the terminal is: the terminal supports that a primary cell may be scheduled by a secondary cell.

In some implementations, the configuration from the base station on the terminal is: a primary cell may be scheduled by the primary cell and a secondary cell, or the characteristic of the terminal is: the terminal supports that a primary cell may be scheduled by the primary cell and a secondary cell, or the capability supported by the terminal is: the terminal supports that a primary cell may be scheduled by the primary cell and a secondary cell.

For example, if the configuration from the base station on the terminal is: the primary cell may be scheduled by the primary cell and the secondary cell, content of the first control information may be determined according to the configuration from the base station on the terminal. In an example, it may be determined, according to the configuration from the base station on the terminal, that the first control information includes a TCI field and/or a CIF. In an example, it may be determined, according to the configuration from the base station, that the first control information includes TCI information and/or CIF indication information.

For example, if the characteristic of the terminal is: the terminal supports that the primary cell may be scheduled by the primary cell and the secondary cell, content of the first control information may be determined according to the characteristic of the terminal. In an example, it may be determined, according to the characteristic of the terminal, that the first control information includes a TCI field and/or a CIF. In an example, it may be determined, according to the characteristic of the terminal, that the first control information includes TCI information and/or CIF indication information.

For example, if the capability supported by the terminal is: the terminal supports that one cell may be scheduled by a plurality of cells, content of the first control information may be determined according to the capability supported by the terminal. In an example, it may be determined, according to the capability supported by the terminal, that the first control information includes a TCI field and/or a CIF. In an example, it may be determined, according to the capability supported by the terminal, that the first control information includes TCI information and/or CIF indication information.

For example, if the configuration from the base station on the terminal is: the primary cell may be scheduled by the primary cell and the secondary cell, content of the second control information may be determined according to the configuration from the base station on the terminal. In an example, it may be determined, according to the configuration from the base station on the terminal, that the second control information includes a TCI field and/or a CIF. In an example, it may be determined, according to the characteristic of the terminal, that the second control information includes TCI information and/or CIF indication information.

For example, if the characteristic of the terminal is: the terminal supports that the primary cell may be scheduled by the primary cell and the secondary cell, content of the second control information may be determined according to the characteristic of the terminal. In an example, it may be determined, according to the characteristic of the terminal, that the second control information includes a TCI field and/or a CIF. In an example, it may be determined, according to the characteristic of the terminal, that the second control information includes TCI information and/or CIF indication information.

For example, if the capability supported by the terminal is: the terminal supports that one cell may be scheduled by a plurality of cells, content of the second control information may be determined according to the capability supported by the terminal. In an example, it may be determined, according to the capability supported by the terminal, that the second control information includes a TCI field and/or a CIE In an example, it may be determined, according to the capability supported by the terminal, that the second control information includes TCI information and/or CIF indication information.

In some embodiments of this application, the first control information includes at least one of the following: first control configuration information and first downlink control information DCI;

and/or the second control information includes at least one of the following: second control configuration information and second DCI.

The first control configuration information is implemented as CORESET configuration information, other configuration information such as a cross-carrier configuration, or at least one of a Scell scheduling Pcell configuration, a Pcell control configuration, a scheduled cell configuration, and a self-scheduling configuration. The second control configuration information is implemented as CORESET configuration information, other configuration information such as a cross-carrier configuration, or at least one of a Scell scheduling Pcell configuration, a Scell control configuration, a scheduling cell configuration, and a non-self-scheduling configuration.

In some embodiments of this application, the first control information is first DCI, the second control information is second DCI, and the first control information and the second control information meet at least one of the following rules:

a fifth rule, where the fifth rule is that the first DCI does not include a transmission configuration indication TCI field and the second DCI does not include a TCI field, or the first DCI includes a TCI field and the second DCI includes a TCI field; and a sixth rule, where the sixth rule is that the first DCI does not include a carrier indicator field CIF and the second DCI does not include a CIF, or the first DCI includes a CIF and the second DCI includes a CIF.

That is, if the second DCI does not include a TCI field, the first DCI does not include a TCI field either, or if the second DCI includes a TCI field, the first DCI also includes a TCI field, so that content of the first DCI can be determined according to content of the second DCI. That is, if the second DCI does not include a CIF, the first DCI does not include a CIF either, or if the second DCI includes a CIF, the first DCI also includes a CIF, so that content of the first DCI can be determined according to content of the second DCI.

In some embodiments of this application, if the first DCI includes a TCI field and the second DCI includes a TCI field, the TCI field included in the first DCI is the same as the TCI field included in the second DCI, where that the TCI field included in the first DCI is the same as the TCI field included in the second DCI may be: the number of bits of the TCI field included in the first DCA is the same as the number of bits of the TCI field included in the second DCI, or a value of the TCI field included in the first DCI is the same as a value of the TCI field included in the second DCI, or a meaning indicated by the TCI field included in the first DCI is the same as a meaning indicated by the TCI field included in the second DCI;

and/or if the first DCI includes a CIF and the second DCI includes a CIF, the CIF included in the first DCI is the same as the CIF included in the second DCI, where that the CIF included in the first DCI is the same as the CIF included in the second DCI may be: the number of bits of the CIF included in the first DCI is the same as the number of bits of the CIF included in the second DCI, or a value of the CIF included in the first DCI is the same as a value of the CIF included in the second DCI, or a meaning indicated by the CIF included in the first DCI is the same as a meaning indicated by the CIF included in the second DCI.

In some embodiments of this application, the first control information is first control configuration information, the second control information is second control configuration information, and the first control information and the second control information meet at least one of the following rules:

a seventh rule, where the seventh rule is that the first control configuration information does not include transmission configuration indication TCI information and the second control configuration information does not include TCI information, or the first control configuration information includes TCI information and the second control configuration information includes TCI information; and an eighth rule, where the eighth rule is that the first control configuration information does not include carrier indicator field CIF indication information and the second control configuration information does not include CIF indication information, or the first control configuration information includes CIF indication information and the second control configuration information includes CIF indication information.

That is, if the second control configuration information does not include TCI information, the first control configuration information does not include TCI information either, or if the second control configuration information includes TCI information, the first control configuration information also includes TCI information, so that content of the first control configuration information can be determined according to content of the second control configuration information. That is, if the second control configuration information does not include CIF indication information, the first control configuration information does not include CIF indication information either, or if the second control configuration information includes CIF indication information, the first control configuration information also includes CIF indication information, so that content of the first control configuration information can be determined according to content of the second control configuration information.

In some embodiments of this application, if the first control configuration information includes TCI information and the second control configuration information includes TCI information, the TCI information included in the first control configuration information is the same as the TCI information included in the second control configuration information, where that the TCI information included in the first DCI is the same as the TCI information included in the second DCI may be: the number of bits of the TCI information included in the first DCI is the same as the number of bits of the TCI information included in the second DCI, or a value of the TCI information included in the first DCI is the same as a value of the TCI information included in the second DCI, or a meaning indicated by the TCI information included in the first DCI is the same as a meaning indicated by the TCI information included in the second DCI, and/or if the first control configuration information includes CIF indication information and the second control configuration information includes CIF indication information, the CFI indication information included in the first control configuration information is the same as the CIF indication information included in the second control configuration information, where that the CIF indication information included in the first DCI is the same as the CIF indication information included in the second DCI may be: the number of bits of the CIF indication information included in the first DCI is the same as the number of bits of the CIF indication information included in the second DCI, or a value of the CIF indication information included in the first DCI is the same as a value of the CIF indication information included in the second DCI, or a meaning indicated by the CIF indication information included in the first DCI is the same as a meaning indicated by the CIF indication information included in the second DCI.

In some embodiments of this application, the first control information is first control configuration information, the terminal expects (or assumes or considers) that the first control configuration information includes transmission configuration indication TCI information, and the TCI information meets at least one of the following:

a value of the TCI information is a first value, and the first value is 1, true, or enable; and the TCI information is the seventh number of bits, and the seventh number of bits may be 1, 2, or 3.

The TCI information may be expressed by using different parameters.

For example, the terminal obtains control configuration information that may be used to schedule at least a CC1 on the CC1. In some implementations, the terminal assumes/expects/considers that tci-PresentInDCI in the control configuration information is set to 1 or true or enable. In some implementations, the terminal obtains control configuration information that may be used to schedule at least a CC1 on the CC1 In some implementations, the terminal assumes/expects/considers that the control configuration information includes tci-PresentInDCI of x0 bits.

The scheduling at least the CC1 includes at least one of two cases in which only the CC1 can be scheduled and the CC1 and a CC other than the CC1 can be scheduled.

The control configuration information may be CORESET configuration information.

In some embodiments of this application, the first control information is first control configuration information, the first control configuration information includes TCI information, and terminal expects that the TCI information indicates at least one of the following:

the first DCI sent on the first serving cell to the terminal includes a TCI; and the first DCI includes a TCI of the seventh number of bits.

For example, the terminal assumes/expects/considers that tci-PresentInDCI in the control configuration information indicates that DCI includes a TCI. In other words, the terminal assumes/expects/considers that tci-PresentInDCI indicates that DCI includes a TCI of x0 bits.

In some embodiments of this application, the first control information is first DCI, the terminal expects that the first DCI includes a TCI of the eighth number of bits, and the eighth number of bits may be 1, 2, or 3.

For example, the terminal obtains DCI that may be used to schedule at least a CC1 on the CC1. In some implementations, the terminal assumes/expects/considers that the DCI includes a transmission configuration indication of x1 or x0 bits.

In some embodiments of this application, the first control information is first control configuration information, the terminal expects that the first control configuration information includes carrier indicator field CIF indication information, and the CIF indication information meets at least one of the following:

a value of the CIF indication information is a second value, the second value is 1 or true, and the CIF indication information may be cif-Presence; and the CIF indication information is the ninth number of bits, the CIF indication information may be carrierIndicatorSize, and the ninth number of bits may be 0, 1, 2, or 3.

The CIF indication information may be expressed by using different parameters, for example, carrierindicatorSize and cif-Presence.

For example, the terminal obtains cif-Presence of a CC1. In some implementations, it is assumed/expected/considered that cif-Presence is set to 1 or true. In some implementations, the terminal obtains carrierindicatorSize of a CC1. In some implementations, it is assumed/expected/considered that carrierindicatorSize is y0 bits.

In some embodiments of this application, the first control information is first control configuration information, the first control configuration information includes CIF indication information, and terminal expects that the CIF indication information indicates at least one of the following:

the first DCI sent on the first serving cell to the terminal includes a CIF; and the first DCI includes a CIF of the ninth number of bits.

For example, the terminal obtains cif-Presence of a CC1. In some implementations, it is assumed/expected/considered that cif-Presence indicates that DCI includes a CIF In some implementations, the terminal obtains carrierindicatorSize of a CC1, and the terminal assumes/expects/considers that carrierindicatorSize is y0 bits, and therefore DCI includes a CIF of y0 bits.

In some embodiments of this application, the first control information is first DCI, the terminal expects that the first DCI includes a CIF of the tenth number of bits, and the tenth number of bits may be 0, 1, 2, or 3.

For example, the terminal obtains DCI that may be used to schedule at least a CC1 on the CC1. In some implementations, the terminal assumes/expects/considers that the DCI includes a CIF of y1 or y0 bits.

In some embodiments of this application, the second control information is second control configuration information, the terminal expects that the second control configuration information includes TCI information, and the TCI information meets at least one of the following:

a value of the TCI information is a third value, and the third value is 1, true, or enable; and the TCI information is the eleventh number of bits, and the eleventh number of bits may be 1, 2, or 3.

The TCI information may be expressed by using different parameters.

For example, the terminal obtains control configuration information that may be used to schedule at least a CC1 on an OSCC. In some implementations, the terminal assumes/expects/considers that tci-PresentInDCI in the control configuration information is set to 1, true, or enable, or the control configuration information includes tci-PresentInDCI of x0' bits.

In some embodiments of this application, the second control information is second control configuration information, the second control configuration information includes TCI information, and terminal expects that the TCI information indicates at least one of the following:

the second DCI sent on the second serving cell to the terminal includes a TCI; and the second DCI includes a TCI of the eleventh number of bits, and the eleventh number of bits may be 1, 2, or 3.

For example, the terminal obtains control configuration information that may be used to schedule at least a CC1 on an OSCC. In some implementations, the terminal assumes/expects/considers that tci-PresentInDCI indicates that DCI includes a TCI, or tci-PresentInDCI indicates that DCI includes a 'TCI of x0' bits.

The scheduling at least the CC1 includes at least one of two cases in which only the CC1 can be scheduled and the CC1 and a CC other than the CC1 can be scheduled.

The control configuration information may be CORESET configuration information.

In some embodiments of this application, the second control information is second DCI, and the terminal expects that the second DCI includes a TCI of the first number of bits.

For example, the terminal obtains DCI that may be used to schedule at least a CC1 on an OSCC. In some implementations, the terminal assumes/expects/considers that the DCI includes a transmission configuration indication of x2 or x0' bits.

In some embodiments of this application, the second control information is second control configuration information, the terminal expects that the second control configuration information includes CIF indication information, and the CIF indication information meets at least one of the following:

a value of the CIF indication information is a fourth value, the fourth value is 1 or true, and the CIF indication information may be cif-Presence; and the CIF indication information is the twelfth number of bits, the CIF indication information may be carrierIndicatorSize, and the twelfth number of bits may be 0, 2, or 3.

The CIF indication information may be expressed by using different parameters, for example, carrierindicatorSize and cif-Presence.

For example, the terminal obtains cif-Presence of an OSCC. In some implementations, it is assumed/expected/considered that cif-Presence is set to 1 or true. In some implementations, the terminal obtains carrierindicatorSize of a CC1. In some implementations, it is assumed/expected/considered that carrierindicatorSize is y0' bits.

In some embodiments of this application, the second control information is second control configuration information, the second control configuration information includes CIF indication information, and terminal expects that the CIF indication information indicates at least one of the following:

the second DCI sent on the second serving cell to the terminal includes a CIF; and the second DCI includes a CIF of the twelfth number of bits.

For example, the terminal obtains cif-Presence of an OSCC. In some implementations, it is assumed/expected/considered that cif-Presence indicates that DCI includes a CIF. In some implementations, the terminal obtains carrier-IndicatorSize of a CC1. In some implementations, it is assumed/expected/considered that carrierindicatorSize is y0' bits, and therefore DCI includes a CIF of y0' bits.

In some embodiments of this application, the control configuration information including the CIF indication information may be cross-carrier scheduling configuration information.

In some embodiments of this application, the second control information is second DCI, the terminal expects that the second DCI includes a CIF of the thirteenth number of bits, and the thirteenth number of bits may be 0, 1, 2, or 3.

For example, the terminal obtains DCI that may be used to schedule at least a CC1 on an OSCC. In some implementations, the terminal assumes/expects/considers that the DCI includes a CIF of y2 or y0' bits.

In the foregoing embodiment, the first control information is used to schedule, on the first serving cell, transmission or resources of the first serving cell, and the second control information is used to schedule, on the second serving cell, transmission or resources of the first serving cell. The transmission includes receiving and sending.

In the foregoing embodiment, x1=x2. In some implementations, y1=y2. In some implementations, x0=x0'. In some implementations, y0=y0'.

In this embodiment of this application, a CIF and/or a TCI field in DCI for scheduling the CC1 by the CC1 is consistent with a corresponding field for scheduling the CC1 by the OSCC. In some implementations, the field in the DCI for scheduling the CC1 by the CC1 and the field for scheduling the CC1 by the OSCC exist or do not exist. If the fields exist, the fields occupy a same quantity of bits.

In some implementations, the field in the DCI for scheduling the CC1 by the CC1 and the field for scheduling the CC1 by the OSCC have a same meaning, or correspond to a same configuration.

In some implementations, the field in the DCI for scheduling the CC1 by the CC1 is all 0 or all 1 or a reserved bit or an invalid bit, or is ignored by the terminal, or a corresponding configuration is invalid or does not exist. For example, a TCI field in the DCI for scheduling the CC1 by the CC1 is all 0 or all 1 or a reserved bit or an invalid bit, or is ignored by the terminal, or a configuration corresponding to the TCI field in the DCI for scheduling the CC1 by the CC1 is invalid or does not exist.

In some embodiments, some parameters in the control configuration signaling of the CC1, such as at least one of tci-PresentInDCI, cif-Presence, and carrierindicatorSize, are the same as corresponding parameters of the OSCC. In some implementations, items in configurations of the CC1 and the OSCC exist or do not exist. If the items exist, the items are the same, for example, the items meet at least one of the same number of bits, the same meaning, and the same signaling structure.

That is, if the OSCC includes a configuration and/or a field, the CC1 also includes the configuration and/or the field corresponding to the configuration. Further, the configuration and/or the filed corresponding to the CC1 may need to be the same as the configuration and/or the field of the OSCC. Being the same includes at least one of the same number of bits, the same meaning, and the same signaling structure. Content may be different or may be the same.

In some implementations, the DCI for scheduling the CC1 by the OSCC and/or the DCI for self-scheduling of the CC1 are/is non fallback DCI.

In some implementations, the DCI for scheduling the CC1 by the OSCC and/or the DCI for self-scheduling of the CC1 are/is at least one of DCI format a-1, DCI format a-2, and DCI format a-b, which may be a same DCI format or different DCI formats, where a is a natural number, and b is a natural number. For example, the DCI is at least one of DCI format 1-1, DCI format 1-2, DCI format 0-2, DCI format 0-3, and DCI format 1-3.

After the foregoing steps, the DCI for self-scheduling of the CC1 or the DCI for scheduling the CC1 on the OSCC includes a same field, and the field occupies a same quantity of bits. Therefore, sizes of the two pieces of DCI are the same, thereby reducing complexity of blind detection by the terminal.

In an embodiment, the CC1 is Pcell, and the OSCC is a Scell 1. If the Pcell may be scheduled by the Scell 1 or may be scheduled by the Pcell itself, at least one of the following is met:

(1) tci-PresentInDCI of control configuration information for self-scheduling on the Pcell is set to 1, true, or enable, or tci-PresentInDCI indicates that DCI includes a TCI; and (2) DCI for self-scheduling on the Pcell includes a transmission configuration indication of x1 bits, and in some implementations, x1=3.

In another specific embodiment, if the Pcell may be scheduled by the Scell 1 or may be scheduled by the Pcell itself, at least one of the following is met:

(1) cif-Presence of the Pcell is set to 1 or true, or cif-Presence indicates that DCI includes a CIF; and (2) DCI for self-scheduling on the Pcell includes a CIF of y1 bits, and in some implementations, Y1=3.

In another embodiment, if the Pcell may be scheduled by the Scell 1 or may be scheduled by the Pcell itself, at least one of the following is met:

(1) tci-PresentInDCI of control configuration information for scheduling the Pcell on the Scell 1 is set to 1, true, or enable, or tci-PresentInDCI indicates that DCI includes a TCI.

In some implementations, tci-PresentInDCI on the Pcell is the same as tci-PresentInDCI on the Scell 1, that is, set to 1, true, or enable, or tci-PresentInDCI indicates that DCI includes a TCI.

(2) DCI for scheduling the Pcell on the Scell 1 includes a transmission configuration indication of x2 bits, and in sonic implementations, x2=3; or in some implementations, DCI of the Pcell includes a transmission configuration indication of x2 bits.

In another embodiment, if the Pcell may be scheduled by the Scell 1 or may be scheduled by the Pcell itself, at least one of the following is met:

(1) cif-Presence of the Scell 1 is set to 1 or true, or cif-Presence indicates that DCI includes a CIF.

In some implementations, cif-Presence on the Pcell is the same as cif-Presence on the Scell 1, that is, set to 1 or true, or cif-Presence indicates that DCI includes a CIF.

(2) DCI for scheduling the Pcell on the Scell 1 includes a CIF of y2 bits, and in some implementations, y2=3; or in some implementations, in this case, DCI of the Pcell includes a CIF of y2 bits.

In another embodiment, if the system supports/or configures/or enables that the CC1 may be scheduled by the CC1 and another (one or more) CCs (OSCC), at least one of the following is met:

(1) A CIF and/or TCI field in DCI for scheduling the CC1 by the CC1 is consistent with a CIF and/or a TCI field in DO for scheduling the CC1 by the OSCC.

In some implementations, the filed in the DCI for scheduling the CC1 by the CC1 and the field for scheduling the CC1 by the OSCC exist or do not exist. If the fields exist, the fields have a same size.

In some implementations, the field in the DCI for scheduling the CC1 by the CC1 and the field for scheduling the CC1 by the OSCC have a same meaning, or resources of corresponding configurations are the same.

In some implementations, the field in the DCI for scheduling the CC1 by the CC1 is all 0 or all 1 or a reserved bit or an invalid bit, or is ignored by a user, or a resource of a corresponding configuration is invalid or does not exist.

(2) At least one of tci-PresentInDCI, cif-Presence, and carrierindicatorSize of the CC1 is the same as a corresponding field of the OSCC.

In some implementations, items in configurations of the CC1 and the OSCC exist or do not exist, lithe items exist, the items are the same.

For example, if the Scell 1 schedules the Pcell by using DCI format x-2, and tci-PresentInDCI of DCI format x-2 is 2 bits, that is, includes 2-bit tci-PresentInDCI, the DCI for self-scheduling of the Pcell also includes 2-bit tci-PresentInDCI. In some implementations, 2-bit tci-PresentInDCI in the DCI for scheduling the Pcell by the Pcell is all 0 or all 1 or a reserved bit or an invalid bit, or is ignored by a user, or a TCI resource (for example, a TCI RS, including at least one of an SSB and a CSI-RS) of a corresponding configuration is invalid or does not exist.

The control configuration information may be CORESET configuration information.

It should be noted that, the control information configuration method provided in the embodiments of this application may be performed by a control information configuration apparatus, or a module that is in the control information configuration apparatus and that is configured to perform and load the control information configuration method. In the embodiments of this application, an example in which the control information configuration apparatus performs and loads the control information configuration method is used to describe the control information configuration method provided in the embodiments of this application.

A control information configuration apparatus in an embodiment of this application is applied to a first serving cell 400, and the first serving cell is scheduled by a second serving cell. As shown in FIG. 5, the apparatus includes:

a first sending module 410, configured to send first control information to a terminal, where the first control information is determined according to at least one of the following:

second control information sent on the second serving cell to the terminal;

a configuration from a base station on the terminal;

a characteristic of the terminal; and a capability supported by the terminal, where the first control information is used to schedule, on the first serving cell, transmission or resources of the first serving cell, and the second control information is used to schedule, on the second serving cell, transmission or resources of the first serving cell.

The control information configuration apparatus in this embodiment of this application may be an apparatus, or may be a component, an integrated circuit, or a chip in a terminal. The apparatus may be a mobile electronic device, or may be a non-mobile electronic device: For example, the mobile electronic device may be a mobile phone, a tablet computer, a laptop computer, a palmtop computer, an in-vehicle electronic terminal, a wearable device, an Ultra-Mobile Personal Computer (UMIPC), a netbook, or a Personal Digital Assistant (PDA). The non-mobile electronic device may be a Network Attached Storage (NAS), a personal computer, a television, an automated teller machine, or a self-service machine. This is not specifically limited in this embodiment of this application.

The control information configuration apparatus in this embodiment of this application may be an apparatus with an operating system. The operating system may be an Android operating system, an iOS operating system, or another possible operating system. This is not specifically limited in the embodiments of this application.

The control information configuration apparatus provided in this embodiment of this application can implement the processes implemented in the control information configuration method in the method embodiment in FIG. 2, To avoid repetition, details are not described herein again.

It should be noted that, the control information configuration method provided in the embodiments of this application may be performed by a control information configuration apparatus, or a module that is in the control information configuration apparatus and that is configured to perform and load the control information configuration method. In the embodiments of this application, an example in which the control information configuration apparatus performs and loads the control information configuration method is used to describe the control information configuration method provided in the embodiments of this application.

Figures 6, 7:
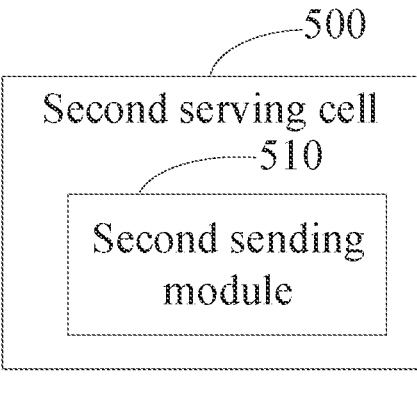

A control information configuration apparatus in an embodiment of this application is applied to a second serving cell 500, and the second serving cell schedules a first serving cell. As shown in FIG. 6, the apparatus includes:

a second sending module 510, configured to send second control information to a terminal, where the second control information is determined according to at least one of the following:

a configuration from a base station on the terminal;

a characteristic of the terminal; and a capability supported by the terminal, where the second control information is used to schedule, on the second serving cell, transmission or resources of the first serving cell.

The control information configuration apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic terminal, a wearable device, a UMPC, a netbook, or a PDA. The non-mobile electronic device may be an NAS, a personal computer, a television, an automated teller machine, or a self-service machine. This is not specifically limited in this embodiment of this application.

The control information configuration apparatus in this embodiment of this application may be an apparatus with an operating system. The operating system may be an Android operating system, an iOS operating system, or another possible operating system. This is not specifically limited in the embodiments of this application.

The control information configuration apparatus provided in this embodiment of this application can implement the processes implemented in the control information configuration method in the method embodiment in FIG. 3. To avoid repetition, details are not described herein again.

It should be noted that, the control information content determining method provided in this embodiment of this application may be performed by a control information content determining apparatus, or a module that is in the control information content determining apparatus and that is configured to perform and load the control information content determining method. In the embodiments of this application, an example in which the control information content determining apparatus performs and loads the control information content determining method is used to describe the control information content determining method provided in the embodiments of this application.

A control information content determining apparatus in an embodiment of this application is applied to a terminal 600. As shown in FIG. 7, the apparatus includes:

an obtaining module 610, configured to obtain first control information of the first serving cell and/or second control information of a second serving cell, where the first serving cell is scheduled by the second serving cell; and a processing module 620, configured to perform transmission according to the first control information and/or the second control information, where content of the first control information is determined according to at least one of the following:

the second control information;

a configuration from a base station on the first serving cell;

a characteristic of the terminal; and a capability supported by the terminal; and content of the second control information is determined according to at least one of the following:

a configuration from a base station on the second serving cell;

a characteristic of the terminal; and a capability supported by the terminal.

The control information content determining apparatus in this embodiment of this application may be an apparatus, or may be a non-mobile electronic device. For example, the non-mobile electronic device may be a base station, an NAS, a personal computer, a television, an automated teller machine, or a self-service machine. This is not specifically limited in this embodiment of this application.

The control information content determining apparatus in this embodiment of this application may be an apparatus with an operating system.

The operating system may be an Android operating system, an iOS operating system, or another possible operating system. This is not specifically limited in the embodiments of this application.

The control information content determining apparatus provided in this embodiment of this application can implement the processes implemented in the control information content determining method in the method embodiment in FIG. 4. To avoid repetition, details are not described herein again.

In some implementations, an embodiment of this application further provides an electronic device, including a processor, a memory, and a program or an instruction that is stored in the memory and that can be run on the processor. When the program or the instruction is executed by the processor, the processes of the foregoing embodiments of the control information content determining method and the control information configuration method are implemented and a same technical effect can be achieved. To avoid repetition, details are not described herein again.

It should be noted that the electronic device in this embodiment of this application includes the foregoing mobile electronic device and the foregoing non-mobile electronic device.

Figure 8:
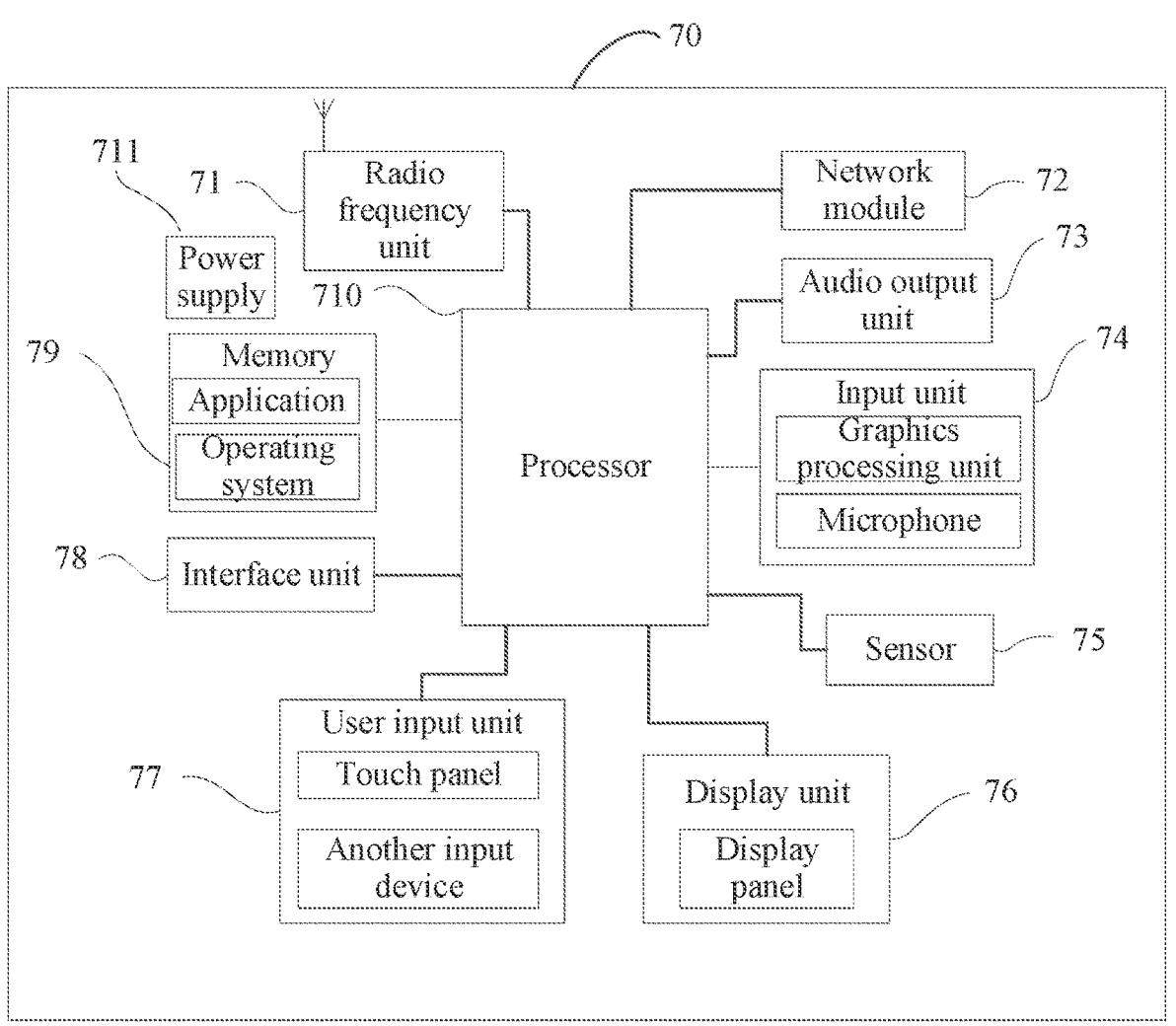
FIG. 8 is a block diagram of a terminal according to an embodiment of this application.

The electronic device in this embodiment may be a terminal. FIG. 8 is a schematic diagram of a hardware structure of a terminal according to the embodiments of this application. A terminal 70 includes but is not limited to components such as a radio frequency unit 71, a network module 72, an audio output unit 73, an input unit 74, a sensor 75, a display unit 76, a user input unit 77, an interface unit 78, a memory 79, a processor 710, and a power supply 711. It can be understood by a person skilled in the art that, the terminal structure shown in FIG. 8 does not constitute any limitation on the terminal, and the terminal may include more or fewer components than those shown in the figure, or combine some components, or have different component arrangements. In this embodiment of this application, the terminal includes but is not limited to a mobile phone, a tablet computer, a notebook computer, a palmtop computer, an in-vehicle terminal, a wearable device, a pedometer, and the like.

It should be understood that, in this embodiment of this application, the radio frequency unit 71 may be configured to receive and send information or a signal in a call process. In some implementations, after receiving downlink data from a base station, the radio frequency unit 710 sends the downlink data to the processor 710 for processing. In addition, the radio frequency unit 71 sends uplink data to the base station. Usually, the radio frequency unit 71 includes but is not limited to an antenna, at least one amplifier, a transceiver, a coupler, a low noise amplifier, a duplexer, and the like. In addition, the radio frequency unit 71 may communicate with a network and another device through a wireless communication system.

The memory 79 may be configured to store a software program and various data. The memory 79 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 79 may include a high-speed random access memory, and may further include a nonvolatile memory, for example, at least one magnetic disk storage device, a flash storage device, or another volatile solid-state storage device.

The processor 710 is a control center of the terminal, and connects all parts of the entire terminal by using various interfaces and lines. By running or executing a software program and/or a module stored in the memory 79 and invoking data stored in the memory 79, the processor 710 performs various functions of the terminal and data processing, to perform overall monitoring on the terminal. The processor 710 may include one or more processing units. An application processor and a modem processor may be integrated into the processor 710. The application processor mainly processes an operating system, a user interface, an application, and the like. The modem processor mainly processes wireless communications. It can be understood that the modem processor may not be integrated into the processor 710.

The terminal 70 may further include the power supply 711 (such as a battery) that supplies power to each component. The power supply 711 may be logically connected to the processor 710 by using a power management system, so as to implement functions such as charging, discharging, and power consumption management by using the power management system.

In addition, the terminal 70 includes some function modules not shown, and details are not described herein.

Figure 9:
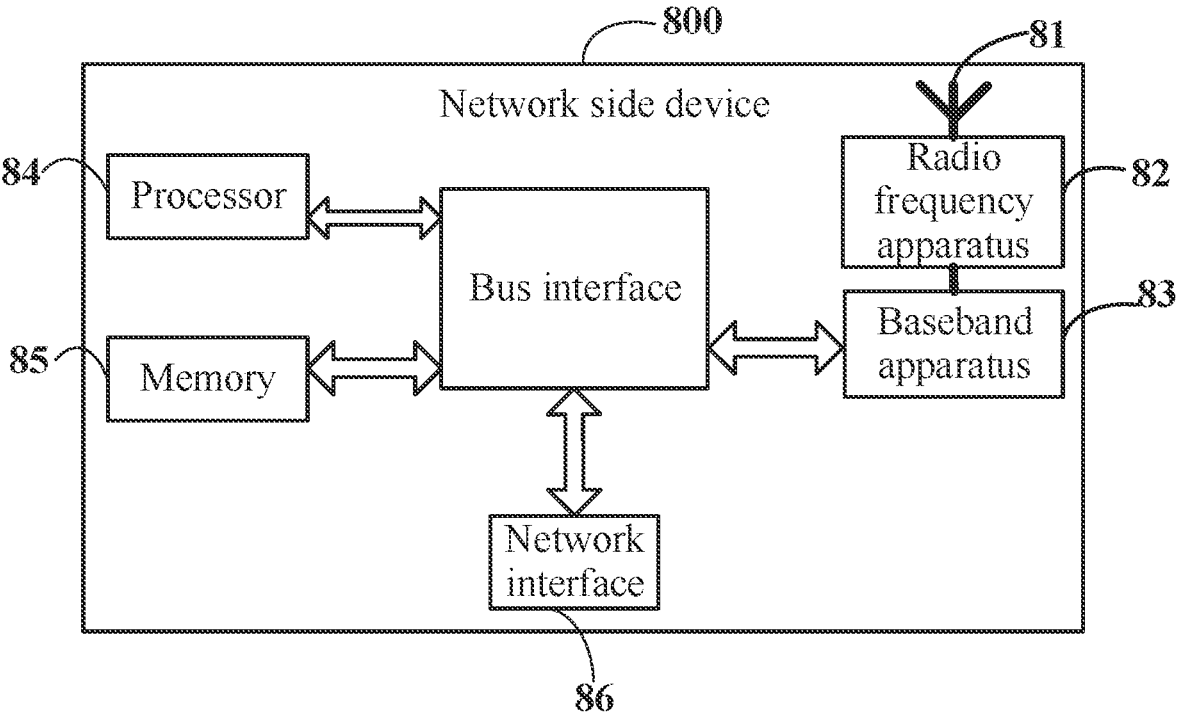
FIG. 9 is a block diagram of a network side device according to an embodiment of this application.

The electronic device in this embodiment may be a network side device of a serving cell or a carrier unit. As shown in FIG. 9, a network side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes information that needs to be sent, and sends processed information to the radio frequency apparatus 82. The radio frequency apparatus 82 processes the received information, and sends processed information by using the antenna 81.

The frequency band processing apparatus may be located in the baseband apparatus 83. The method performed by the network side device in the foregoing embodiment may be implemented in the baseband apparatus 83. The baseband apparatus 83 includes a processor 84 and a memory 85.

The baseband apparatus 83 may include, for example, at least one baseband board, where a plurality of chips is disposed on the baseband board. As shown in FIG. 9, one chip is, for example, the processor 84, which is connected to the memory 85, so as to invoke a program in the memory 85 to perform operations of the network side device shown in the foregoing method embodiment.

The baseband apparatus 83 may further include a network interface 86, configured to exchange information with the radio frequency apparatus 82. For example, the interface is a Common Public Radio interface (CPRI).

The processor herein may be one processor, or may be a general name of a plurality of processing elements. For example, the processor may be a CPU, or may be an ASIC, or one or more integrated circuits configured to implement the method performed by the foregoing network side device, for example, one or more microprocessors DSP, or one or more Field Programmable Gate Arrays (FPGAs). A storage element may be a memory, or may be a general term of a plurality of storage elements.

The memory 85 may be a volatile memory or a nonvolatile memory, or may include a volatile memory and a nonvolatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), used as an external cache. Through example but not imitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). The memory 85 described in this specification is intended to include but not limited to these memories and any memory of another proper type.

An embodiment of this application further provides a readable storage medium. The readable storage medium stores a program or an instruction, and when the program or the instruction is executed by a processor, the processes of the foregoing embodiment of the control information content determining method or the control information configuration method are implemented and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing embodiment of the control information content determining method or the control information configuration method and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A control information configuration method, performed by a first serving cell, wherein the first serving cell is scheduled by a second serving cell, and the method comprises:

sending first control information to a terminal, wherein the first control information is determined according to:

second control information sent on the second serving cell to the terminal, wherein the first control information is used to schedule, on the first serving cell, transmission or resources of the first serving cell, and the second control information is used to schedule, on the second serving cell, transmission or resources of the first serving cell, wherein the first control information is first Downlink Control Information (DCI), the second control information is second DCI, and when the first DCI comprises a Carrier Indicator Field (CIF) and the second DCI comprises a CIF, the number of bits of the CIF included in the first DCI is the same as the number of bits of the CIF included in the second DCI; or when the second DCI does not comprise a CIF, the first DCI does not comprise a CIF.

2. The control information configuration method according to claim 1, wherein the first control information and the second control information further meet the following rule:

a first rule, wherein the first rule is that the first DCI does not comprise a Transmission Configuration Indication (TCI) field and the second DCI does not comprise a TCI field, or the first DCI comprises a TCI field and the second DCI comprises a TCI field.

3. The control information configuration method according to claim 2, wherein when the first DCI comprises a TCI field and the second DCI comprises a TCI field, the TCI field comprised in the first DCI is the same as the TCI field comprised in the second DCI.

4. The control information configuration method according to claim 2, wherein the number of bits of the TCI included in the first DCI is the same as the number of bits of the TCI included in the second DCI.

5. The control information configuration method according to claim 1, wherein the first serving cell supports, is configured for, or is enabled for cross-carrier scheduling; or the second serving cell supports, is configured for, or is enabled for cross-carrier scheduling.

6. A control information configuration method, performed by a second serving cell, wherein the second serving cell schedules a first serving cell, and the method comprises:

sending second control information to a terminal, wherein the second control information is determined according to:

first control information sent on the second serving cell to the terminal, wherein the second control information is used to schedule, on the second serving cell, transmission or resources of the first serving cell, wherein the first control information is first Downlink Control Information (DCI), the second control information is second DCI, and when the first DCI comprises a Carrier Indicator Field (CIF) and the second DCI comprises a CIF, the number of bits of the CIF included in the first DCI is the same as the number of bits of the CIF included in the second DCI; or when the second DCI does not comprise a CIF, the first DCI does not comprise a CIF.

7. The control information configuration method according to claim 6, wherein the first control information and the second control information further meet the following rule:

a first rule, wherein the first rule is that the first DCI does not comprise a Transmission Configuration Indication (TCI) field and the second DCI does not comprise a TCI field, or the first DCI comprises a TCI field and the second DCI comprises a TCI field.

8. The control information configuration method according to claim 4, wherein when the first DCI comprises a TCI field and the second DCI comprises a TCI field, the TCI field comprised in the first DCI is the same as the TCI field comprised in the second DCI.

9. The control information configuration method according to claim 7, wherein the number of bits of the TCI included in the first DCI is the same as the number of bits of the TCI included in the second DCI.

10. The control information configuration method according to claim 6, wherein the second serving cell supports, is configured for, or is enabled for cross-carrier scheduling.

11. A control information content determining method, performed by a terminal of a first serving cell, wherein the method comprises:

obtaining first control information of the first serving cell and second control information of a second serving cell, wherein the first serving cell is scheduled by the second serving cell; and performing transmission according to the first control information and the second control information, wherein content of the first control information is determined according to:

the second control information; or content of the second control information is determined according to:

the first control information, wherein the first control information is first Downlink Control Information (DCI), the second control information is second DCI, and when the first DCI comprises a Carrier Indicator Field (CIF) and the second DCI comprises a CIF, the number of bits of the CIF included in the first DCI is the same as the number of bits of the CIF included in the second DCI; or when the second DCI does not comprise a CIF, the first DCI does not comprise a CIF.

12. The control information content determining method according to claim 11, wherein the first control information and the second control information further meet the following rule:

a first rule, wherein the first rule is that the first DCI does not comprise a Transmission Configuration Indication (TCI) field and the second DCI does not comprise a TCI field, or the first DCI comprises a TCI field and the second DCI comprises a TCI field.

13. The control information content determining method according to claim 12, wherein when the first DCI comprises a TCI field and the second DCI comprises a TCI field, the TCI field comprised in the first DCI is the same as the TCI field comprised in the second DCI.

14. The control information content determining method according to claim 12, wherein the number of bits of the TCI included in the first DCI is the same as the number of bits of the TCI included in the second DCI.

* * * * *